(12) United States Patent
Kawaai

(10) Patent No.: US 7,572,013 B2
(45) Date of Patent: Aug. 11, 2009

(54) PROJECTION DISPLAY

(75) Inventor: Satoru Kawaai, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 471 days.

(21) Appl. No.: 11/409,968

(22) Filed: Apr. 25, 2006

(65) Prior Publication Data

US 2006/0244920 A1  Nov. 2, 2006

(30) Foreign Application Priority Data

Apr. 26, 2005  (JP)  ............ P.2005-128208

(51) Int. Cl.
  *G03B 21/14*  (2006.01)
(52) U.S. Cl. ............ 353/20; 359/494
(58) Field of Classification Search .......... 353/20, 353/33, 81; 359/494, 495, 497, 498, 500
  See application file for complete search history.

(56) References Cited

U.S. PATENT DOCUMENTS

| | | | | |
|---|---|---|---|---|
| 5,772,299 | A * | 6/1998 | Koo et al. ............ | 353/20 |
| 6,010,221 | A * | 1/2000 | Maki et al. ............ | 353/33 |
| 6,273,567 | B1 * | 8/2001 | Conner et al. ............ | 353/20 |
| 6,343,864 | B1 * | 2/2002 | Tajiri ............ | 353/20 |
| 6,345,895 | B1 * | 2/2002 | Maki et al. ............ | 353/33 |
| 6,407,868 | B1 * | 6/2002 | Ishibashi et al. ............ | 359/634 |
| 6,419,362 | B1 * | 7/2002 | Ikeda et al. ............ | 353/20 |
| 6,588,905 | B2 * | 7/2003 | Sekine ............ | 353/20 |
| 6,637,890 | B1 * | 10/2003 | Shiue et al. ............ | 353/31 |
| 6,637,891 | B2 * | 10/2003 | Na ............ | 353/33 |
| 6,705,731 | B2 * | 3/2004 | Inoue ............ | 353/20 |
| 6,891,577 | B2 * | 5/2005 | Sekine et al. ............ | 349/8 |
| 6,910,773 | B2 * | 6/2005 | Nakashima et al. ............ | 353/20 |
| 6,980,280 | B2 * | 12/2005 | Roddy et al. ............ | 355/67 |
| 6,991,334 | B2 * | 1/2006 | Okuyama et al. ............ | 353/20 |
| 7,044,607 | B2 * | 5/2006 | Ouchi et al. ............ | 353/31 |
| 7,066,600 | B2 * | 6/2006 | Nakashima et al. ............ | 353/20 |
| 7,070,282 | B2 * | 7/2006 | Manabe et al. ............ | 353/20 |
| 7,137,704 | B2 * | 11/2006 | Okuyama et al. ............ | 353/20 |
| 7,159,987 | B2 * | 1/2007 | Sakata ............ | 353/31 |
| 7,188,955 | B2 * | 3/2007 | Kang ............ | 353/33 |
| 7,192,141 | B2 * | 3/2007 | Van Den Bossche et al. .. | 353/33 |
| 7,213,924 | B2 * | 5/2007 | Okuyama et al. ............ | 353/33 |
| 7,255,444 | B2 * | 8/2007 | Nakashima et al. ............ | 353/20 |

(Continued)

FOREIGN PATENT DOCUMENTS

EP  1 463 339 A2  9/2004

(Continued)

*Primary Examiner*—William C Dowling
*Assistant Examiner*—Bao-Luan Le
(74) *Attorney, Agent, or Firm*—Birch, Stewart, Kolasch & Birch, LLP

(57) ABSTRACT

A projection display uses reflective liquid crystal display elements for each color light to prevent ghost image. A $\lambda/4$ wave plate is disposed between a crossed dichroic prism assembly for color combination and the projection optical system to convert the state of polarization between linear polarization and circular polarization. Wavelength selective wave plates, each of which transmit the projected color light without varying its orientation of polarization but rotate the orientations of polarization of the other color lights 90 degrees, are disposed between the entrance face of the crossed dichroic prism assembly and each of a polarization beam splitter for blue light, a polarization beam splitter for green light, and a polarization beam splitter for red light.

4 Claims, 3 Drawing Sheets

U.S. PATENT DOCUMENTS

| | | | |
|---|---|---|---|
| 7,293,877 B2* | 11/2007 | Inoue | 353/31 |
| 7,357,511 B2* | 4/2008 | Aastuen et al. | 353/20 |
| 7,377,655 B2* | 5/2008 | Manabe et al. | 353/33 |
| 2002/0080331 A1* | 6/2002 | Na | 353/20 |
| 2003/0202129 A1* | 10/2003 | Sekine et al. | 349/5 |
| 2004/0130784 A1* | 7/2004 | Williams et al. | 359/485 |
| 2004/0207817 A1* | 10/2004 | Nakada et al. | 353/33 |
| 2005/0007555 A1* | 1/2005 | Manabe et al. | 353/20 |
| 2005/0024591 A1* | 2/2005 | Lian et al. | 353/20 |
| 2005/0062936 A1* | 3/2005 | Okuyama et al. | 353/20 |
| 2005/0157265 A1* | 7/2005 | Florence et al. | 353/20 |
| 2005/0237489 A1* | 10/2005 | Nakashima et al. | 353/20 |
| 2006/0044515 A1* | 3/2006 | Suzuki | 353/20 |
| 2006/0055891 A1* | 3/2006 | Florence et al. | 353/20 |
| 2006/0066811 A1* | 3/2006 | Sato et al. | 353/20 |
| 2006/0126020 A1* | 6/2006 | Hirata et al. | 353/20 |
| 2007/0139620 A1* | 6/2007 | Bruzzone | 353/20 |

FOREIGN PATENT DOCUMENTS

| | | |
|---|---|---|
| JP | 9-251150 A | 9/1997 |
| JP | 2004-29692 A | 1/2004 |

* cited by examiner

PROJECTION DISPLAY

FIELD OF THE INVENTION

The present invention relates to a projection display designed to take out color lights reflected from plural reflective liquid crystal display elements by making use of polarization, to combine the color lights, and to project the combined light by projection optical system and, more particularly, to a display device for preventing ghost that would normally be caused by light reflected from the projection optical system.

BACKGROUND OF THE INVENTION

A projection display has been heretofore available which converts white light from a light source into linearly polarized light, decomposes the light into red (R), green (G), and blue (B) lights, enters the three color lights on their respective reflective liquid crystal display elements via polarization beam splitters, combines the color lights reflected from the elements into one by color combining optical system, and causes the combined light to enter projection optical system such that an image in full color is projected and displayed on a screen. In this display device, each reflective liquid crystal display element performs polarization modulation to vary the orientation of polarization such that each color light possesses different image information. The color lights which have been polarization-modulated are combined into one by crossed dichroic prisms for color combination. The emerging combined light is projected toward the screen through the projection optical system. An image is displayed on the screen.

In this projection display, a part of the combined light incident on the projection optical system is reflected from lenses or apertures within the projection optical system, thus producing noise light. The noise light passes through crossed dichroic prisms and deflection beam splitters and reenter the reflective liquid crystal display elements. The light is again reflected here and combined with the aforementioned combined light. The produced light is projected onto the screen as a ghost image, thus presenting a problem. It is known that this problem can be alleviated by techniques described, for example, in JP-A-9-251150 and JP-A-2004-29692.

In the technique described in JP-A-9-251150, a λ/4 wave plate is inserted between the projection optical system and the crossed dichroic prism assembly for color combination such that the orientation of polarization of the noise light reflectively returning from the projection optical system is rotated through 90°. Accordingly, the orientation of polarization of the noise light when it has returned again to the polarization beam splitters through the crossed dichroic prisms is s-polarized light that is produced by rotating normal, polarization-modulated light (assumed to be p-polarized light) through 90°. Therefore, the noise light is discarded off the optical path without reentering the reflective liquid crystal display elements via the polarization beam splitters.

In the technique described in JP-A-2004-29692, the λ/4 wave plate used in the technique of JP-A-9-251150 is employed. In addition, a dichroic mirror that transmits red light but reflects other color lights is disposed between the polarization beam splitter for red light and the pair of crossed dichroic mirrors. Another dichroic mirror that transmits blue light but reflects other color lights is disposed between the polarization beam splitter for blue light and the pair of crossed dichroic prisms. Noise light that is different in orientation of polarization is discarded by making use of the characteristics of polarization beam splitters as in JP-A-9-251150. In addition, noise light of green color traveling toward the reflective liquid crystal display elements for red and blue lights is discarded off the optical path by reflection off the dichroic mirrors.

However, it is known that the dichroic film used in crossed dichroic prisms shows spectral transmissive or spectral reflective characteristics which are not always uniform about p- and s-polarized light and hence has some degree of dependence on wavelength. Therefore, even if a λ/4 wave plate is used as described in JP-A-9-251150 1, and if noise light reflected from the projection optical system is made to reenter the crossed dichroic prisms, for example, as p- or s-polarized light by the λ/4 wave plate, it is unlikely that the dichroic film correctly spectrally decomposes the noise light and the color lights reenter their respective polarization beam splitters. Some of the p- or s-polarized light of other color light enter the polarization beam splitters. The result is that a part of noise light of other color light reenters the reflective liquid crystal display elements mounted for certain color lights. Ghost image is not suppressed sufficiently. This adversely affects the color reproducibility.

In this respect, if a wavelength selective dichroic mirror is used in combination to prevent other color lights exiting from the crossed dichroic prisms from entering polarization beam splitters mounted for certain color lights as known in JP-A-2004-29692, an improvement will be achieved. However, in order to discard unwanted color lights off the optical path, the dichroic mirror is mounted at an angle to the optical axis. Nonetheless, the spectral transmissive and reflective characteristics of the dichroic mirror have dependence on the incidence angle. Furthermore, normal polarization-modulated light exiting from the reflective liquid crystal display elements enter the dichroic mirror at various angles. This is a factor causing color nonuniformity in the projected image. Additionally, the dichroic mirror is made of a transparent base plate such as a glass plate on which a dichroic film of multilayer film configuration is formed and so the astigmatism, for example, in the projection optical system may be deteriorated depending on the thickness of the base plate.

SUMMARY OF THE INVENTION

An object of an illustrative, non-limiting embodiment of the present invention is to provide a projection display which removes ghost image without producing problems such as color nonuniformity and aberration as described above.

An exemplary embodiment of the present invention provides a projection display for decomposing white light into three colors (red, green, and blue) of light by a color separation optical system, entering the three color lights on their respective reflective liquid crystal display elements via their respective polarization beam splitters, causing the polarization-modulated color lights exiting from the reflective liquid crystal display elements to hit entrance faces of a color combining prism through the polarization beam splitters, and projecting the combined light existing from the color combining prism toward a screen by projection optical system. A polarization converter is disposed between the exit face of the color combining prism and the entrance face of the projection optical system to convert state of polarization of light passing through the converter device between linear polarization and circular polarization. A wavelength selective wave plate is disposed between the exit face of at least one of the polarization beam splitters and the entrance face of the color combining prism, the wavelength selective wave plate showing a characteristic of a λ/2 wave plate according to wavelength.

Advantageously, wavelength selective wave plates are used for the respective three color lights. In this case, each wavelength selective wave plate transmits the corresponding one of the color lights without varying the state of polarization. With respect to the other two color lights, the wave plate is operated as a λ/2 wave plate. Furthermore, in order to implement the present invention more effectively, a λ/2 wave plate is preferably mounted between the polarization beam splitter for green light and the color combining prism, or a λ/2 wave plate is preferably mounted between the polarization beam splitter for blue light and the color combining prism and a λ/2 wave plate is preferably mounted between the polarization beam splitter for red light and the color combining prism, so as to rotate the orientation of polarization of each color light, which passes through the λ/2 wave plate, 90 degrees. The orientation of polarization of green light exiting from the color combining prism is made perpendicular to the orientation of polarization of the blue and red lights by the λ/2 wave plate.

According to an exemplary embodiment of the present invention, ghost that cannot be fully removed only if a λ/4 wave plate is inserted between a color combining prism and the projection optical system can be reduced certainly. Furthermore, the structure consisting of a dichroic mirror mounted obliquely within the optical path of normal polarization-modulated light is dispensed with. Consequently, occurrence of a ghost image in the projected image can be prevented without producing color nonuniformity or astigmatism.

DETAILED DESCRIPTION OF THE INVENTION

Figure 1:
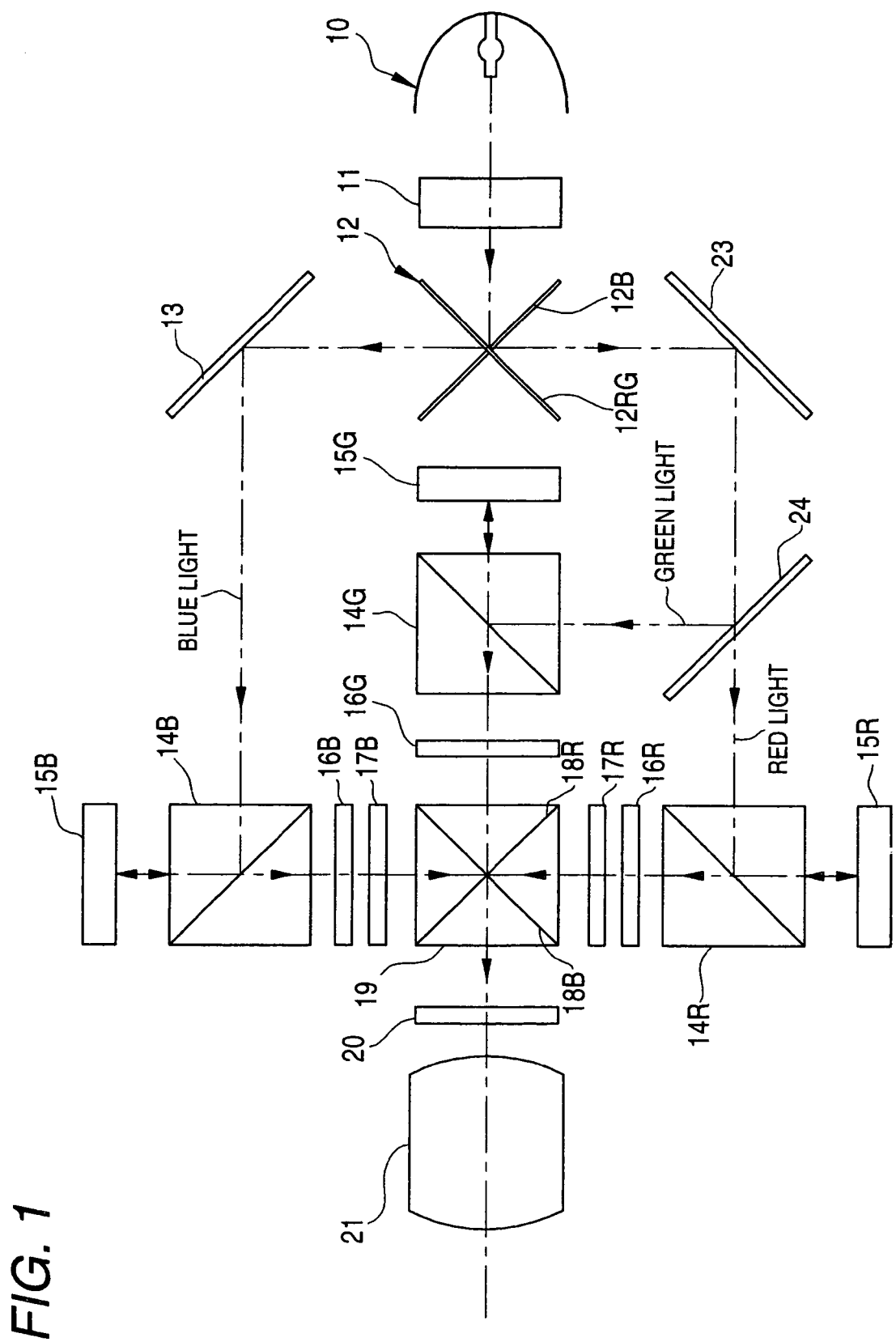
FIG. 1 is a diagram illustrating the configuration of a projection display showing an exemplary embodiment of the present invention.

A projection display according to an exemplary embodiment of the present invention is hereinafter described in detail by referring to FIG. 1. Light existing from a light source 10 is converted into linearly polarized light all having one orientation (direction) of polarization (perpendicular to the plane of the paper in FIG. 1) by a polarization converter 11. The light then enters a crossed dichroic mirror assembly 12 consisting of dichroic mirrors 12B and 12RG which are perpendicular to each other. The dichroic mirror 12B has such characteristics that it reflects blue light (B light) and transmits green light (G light) and red light (R light). The dichroic mirror 12RG has such characteristics that it transmits blue light and reflects green and red lights. Therefore, the blue light contained in the incident white light is reflected upward as viewed in the figure by the crossed dichroic mirror assembly 12, is reflected to the left by a mirror 13, and enters a polarization beam splitter 14B.

The polarization beam splitter 14B has a film of polarization on the joint plane between two right-angled prisms, the film of polarization being tilted at an angle of 45° to the optical axis. The splitter 14B reflects s-polarized light but transmits p-polarized light. Accordingly, blue light enters as s-polarized light into the polarization beam splitter 14B and is reflected toward the reflective liquid crystal display element 15B for blue light. The reflective liquid crystal display element 15B reflects the incident blue light again toward the polarization beam splitter 14B. At this time, the display element 15B modulates the orientation of polarization of the blue light for each pixel for image reproduction.

Figure 2A:
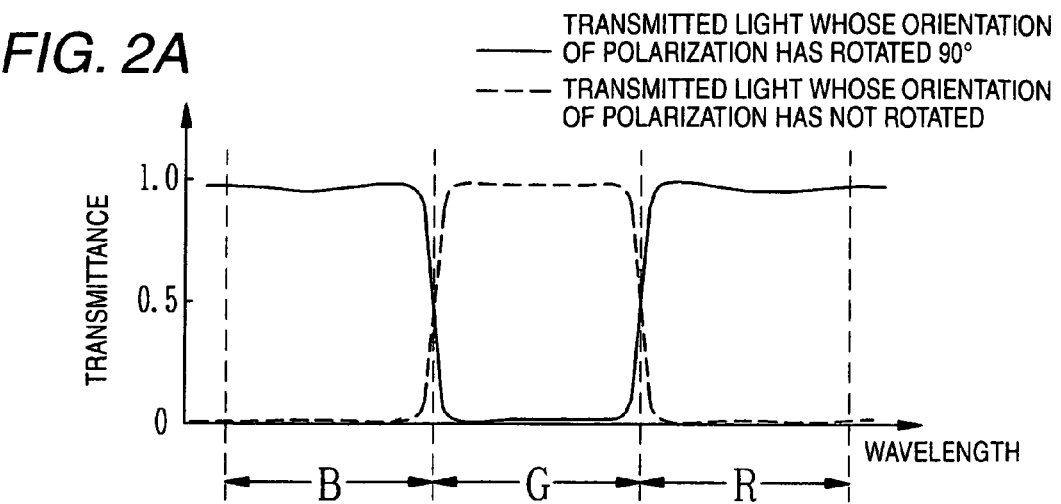
FIGS. 2A to 2C are diagrams showing the optical characteristics of a wavelength selective wave plate used in an exemplary embodiment of the invention.
Figure 2B:
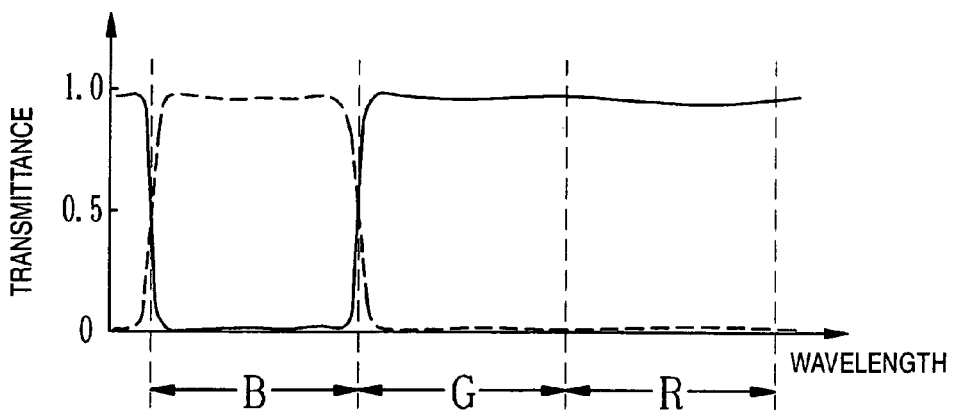

The blue light which has been polarization-modulated for each pixel by the reflective liquid crystal display element 15B enters the polarization beam splitter 14B. Only the p-polarized component is transmitted and enters the wavelength selective wave plate 16B. The wave plate 16B has polarization conversion characteristics as shown in FIG. 2B. That is, this wave plate 16B is almost transparent and the amount of transmitted light little varies over the whole range of visible light. However, at the wavelengths of the blue light, the orientation of polarization of incident light is not varied at all. With respect to the other color lights, i.e., green and red lights, the wave plate rotates the orientation of polarization of the incident light 90 degrees. Accordingly, the blue light exiting from the polarization beam splitter 14B transmits through the wavelength selective wave plate 16B without change and enters the λ/2 wave plate 17B for blue light. Since the wave plate 17B rotates the orientation of polarization of the incident blue light 90 degrees, the orientation of polarization of the blue light is converted to a direction perpendicular to the plane of the paper.

The blue light transmitted through the λ/2 wave plate 17B enters a crossed dichroic prism assembly 19 having dichroic films 18B and 18R. The dichroic film 18B reflects blue light and transmits green and red lights. The dichroic film 18R reflects red light and transmits blue and green lights. The blue light whose orientation of polarization has been made perpendicular to the plane of the paper is efficiently reflected toward projection optical system 21 by the dichroic film 18B. The light then exits from the crossed dichroic prism assembly 19 and is transmitted through a λ/4 wave plate 20, whereby the light is converted into circularly polarized light. The light is projected onto a screen or the like as an image of blue light through the projection optical system 21. The λ/4 wave plate 20 used herein acts as a polarization converter for converting the state of polarization of the incident light beam between linear polarization and circular polarization. Since the λ/4 wave plate 20 is required to operate similarly on green and red lights as well as on blue light as described later, if the value of λ is optimized for green light lying almost midway of the wavelength range of the visible light, the λ/4 wave plate 20 can be practically used as a λ/4 wave plate for both blue and red lights.

On the other hand, the red and green lights pass through the polarization converter 11 and then are reflected downward in the figure by the dichroic mirror 12RG that reflects red and green lights but transmits blue light. The both color lights are reflected by the mirror 23 and then spectrally decomposed by the dichroic mirror 24 that transmits red light but reflects green light. The red light transmitted through the dichroic mirror 24 is reflected by the polarization beam splitter 14R and then enters a reflective liquid crystal display element 15R for red light. The green light reflected by the dichroic mirror 24 is reflected by the polarization beam splitter 14G and then enters the reflective liquid crystal display element 15G for green light. In this way, the white light from the light source 10 is spectrally decomposed into the three color lights (B, G, and R) by the color separation optical system including the crossed dichroic mirror assembly 12 and the dichroic mirror 24. The color lights are guided to the polarization beam splitters 14B, 14G, and 14R, respectively.

Figure 2C:
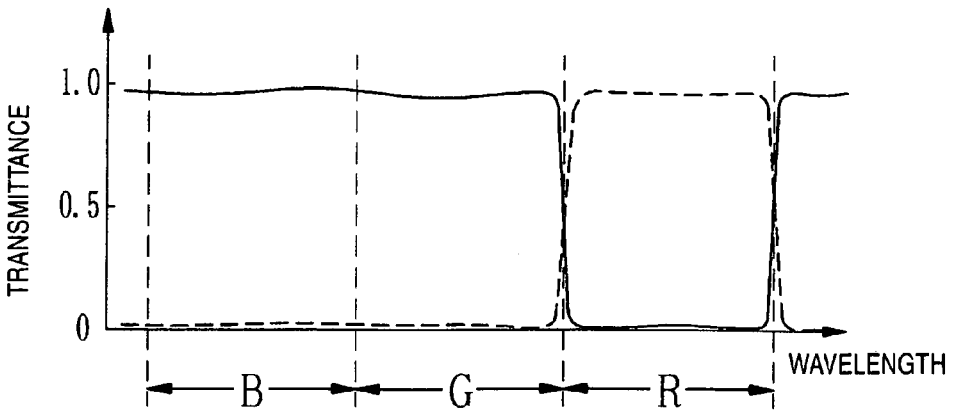

When incident red and green lights are again reflected to the polarization beam splitters 14R and 14G, respectively, the reflective liquid crystal display elements 15R and 15G modulate the orientation of polarization of each of the red and green lights for each pixel. The polarization-modulated red and green lights obtained in this way are made to enter the polarization beam splitters 14R and 14G, respectively. Only their p-polarized components are transmitted. They enter wavelength selective wave plates 16R and 16G, respectively, which have polarization transmissive characteristics as shown in FIGS. 2C and 2A, respectively. The red and green lights are transmitted without change such that their orientations of polarization are not varied. When the red light is transmitted through a λ/2 wave plate 17R, the orientation of polarization is rotated 90 degrees. The orientation becomes perpendicular to the plane of the paper similarly to the blue light and enters the crossed dichroic prism assembly 19. The green light enters the crossed dichroic prism assembly 19 while the orientation of polarization is kept parallel to the plane of the paper. The orientation of polarization becomes perpendicular to the orientations of polarization of blue and red lights.

To make the orientation of polarization of the green light perpendicular to the orientations of polarization of blue and red lights, the polarization beam splitter 14G for green light, for example, may be rotated 90 degrees about the optical axis such that the entrance face for green light spectrally isolated by the dichroic mirror 24 becomes parallel to the plane of the paper, instead of using the λ/2 wave plate as described previously. In this case, however, at least the green light reflected by the dichroic mirror 24 must be bent to the direction perpendicular to the plane of the paper. As a result, the whole optical system tends to increase in size. In this respect, using the λ/2 wave plates 17B and 17R as shown in FIG. 1 is advantageous in compacting the device at least in the direction perpendicular to the plane of the paper.

The red light incident on the crossed dichroic prism assembly 19 in this way is reflected by the dichroic film 18R, circularly polarized by the λ/4 wave plate 20, enters the projection optical system 21, and is projected onto a screen as an image of red light. The green light is transmitted through the dichroic films 18B and 18R, circularly polarized by the λ/4 wave plate 20, and then enters the projection optical system 21. Thus, the light is projected as an image of green light onto the screen. In this way, the crossed dichroic prism assembly 19 acts as a color combining prism that receives the polarization-modulated blue, green, and red lights from their respective entrance faces, combines the color lights, and makes the combined light pass through the common exit face and enter the projection optical system.

The structure of the aforementioned projection display is characterized in that: the λ/4 wave plate 20 is disposed between the exit face of the crossed dichroic prism assembly 19 and the entrance face of the projection optical system 21; the wavelength selective wave plate 16B is disposed between the polarization beam splitter 14B for blue light and the crossed dichroic prism assembly 19; and the wavelength selective wave plate 16R is disposed between the polarization beam splitter 14R for red light and the crossed dichroic prism assembly 19. Because of this structure, when a full-color image is projected onto a screen through the projection optical system 21 after exiting from the crossed dichroic prism assembly 19, noise light reflected from lenses and apertures constituting the projection optical system 21 is prevented from reentering the reflective liquid crystal display elements 15B, 15G, and 15R; otherwise, ghost image would appear. The operation is next described.

As described previously, the wavelength selective wave plates 16G, 16B, and 16R have a function of not varying the orientation of polarization of the incident light according to the wavelength or rotating the orientation 90 degrees. The characteristics are schematically shown in FIGS. 2A, 2B, and 2C, which show the polarization conversion characteristics of the wavelength selective wave plates 16G, 16B, and 16R. In each of these diagrams, wavelength is plotted on the horizontal axis. The transmittance (light transmittance) is plotted on the vertical axis. For example, the polarization conversion characteristics shown in FIG. 2A mean that green light is transmitted without rotating the orientation of polarization. Red and blue lights are transmitted after rotating each of the orientations of polarization 90 degrees. Similarly, FIG. 2B shows the characteristics which transmit blue light without change, rotate each of the orientations of polarization of green and red lights 90 degrees, and transmit them. FIG. 2C shows the characteristics which transmit red light without change, rotate each of the orientations of polarization of blue and green lights, and transmit the blue and green lights. For example, ColorSelect™ filters from Colorlink, Inc. can be effectively used as such wavelength selective wave plates. Another feature is that the polarization transmissive characteristics of wavelength selective wave plates of this kind show little dependence on the angle of incidence.

By combining these wavelength selective wave plates 16G, 16B, and 16R with the λ/4 wave plate 20 and using the combinations, noise light reflected inside the projection optical system 21 can be prevented from reentering the reflective liquid crystal display elements 15B, 15G, and 15R. As described previously, the blue and red lights existing from the crossed dichroic prism assembly 19 have orientations of polarization perpendicular to the plane of the paper. The green light has an orientation of polarization parallel to the plane of the paper. The three color lights are converted into circularly polarized color lights by the λ/4 wave plate 20. Then, the color lights are projected toward the screen through the projection optical system 21. However, noise light produced by reflection inside the projection optical system 21 reenters the λ/4 wave plate 20.

Accordingly, each of the blue, green, and red lights contained in the noise light is converted into linearly polarized light whose orientation of polarization has been rotated 90 degrees relative to the original orientation of polarization when the color light passes through the ) λ/4 wave plate 20. The red and blue lights become linearly polarized light whose orientation of polarization is parallel to the plane of the paper. The green light becomes linearly polarized light whose orientation of polarization is perpendicular to the plane of the paper, and reenters from the exit face of the crossed dichroic prism assembly 19. These components of noise light enter the dichroic films 18B and 18R of the crossed dichroic prism assembly 19 at random angles of incidence. Therefore, parts of the blue and red lights are transmitted through the crossed dichroic prism assembly 19 in addition to green light. Then, they exit toward the reflective liquid crystal display element 15G for green light.

The green light exiting in this way passes through the crossed dichroic prism assembly 19, where the orientation of polarization is made perpendicular to the plane of the paper and thus the light becomes s-polarized light. Then, the light reaches the wavelength selective wave plate 16G. The light enters the polarization beam splitter 14G while maintained as s-polarized light (i.e., the orientation of polarization is not varied according to the transmissive characteristics of FIG. 2A) and so the light is reflected by the polarization beam splitter 14G and discarded off the optical path. The orientations of polarization of blue and red lights exiting toward the reflective liquid crystal display element 15G for green light are parallel to the plane of the paper and thus these color lights are p-polarized light. When they pass through the wavelength selective wave plate 16G, their orientations of polarization each are rotated 90 degrees and thus become s-polarized light whose orientation of polarization is perpendicular to the plane of the paper. The blue and red lights enter the polarization beam splitter 14G. Consequently, these two color lights are discarded off the optical path in the same way as the green light. As a result, none of the colors of noise light reenter the reflective liquid crystal display element 15G (irrespective of the colors). Hence, generation of ghost image due to green light can be prevented.

Noise light exiting from the crossed dichroic prism assembly 19 toward the reflective liquid crystal display element 15R for red light, i.e., noise light reflected from the dichroic film 18R, contains a part of green light as well as red light because the reflective characteristics of the dichroic film 18R has dependence on the angle of incidence. Since the range of wavelengths of blue light is greatly different from the spectral reflective characteristics of the dichoric film 18R, reflection of the blue light can be neglected. The red light reflected from the dichroic film 18R has a orientation of polarization parallel to the plane of the paper. When the red light passes through the $\lambda/2$ wave plate 17R, the orientation of polarization is rotated 90 degrees and becomes perpendicular to the plane of the paper. The orientation of polarization possessed by the red light is conserved when passing through the wavelength selective wave plate 16R. The red light passes as s-polarized light into the polarization beam splitter 14R. Therefore, the red light is reflected by the polarization beam splitter 14R and discarded off the optical path.

Since the orientation of polarization of green light exiting from the crossed dichroic prism assembly 19 toward the reflective liquid crystal display element 15R for red light is perpendicular to the plane of the paper, the orientation of polarization becomes parallel to the plane of the paper when the light passes through the $\lambda/2$ wave plate 17R, and the light enters the wavelength selective wave plate 16R. Because the wavelength selective wave plate 16R acts to rotate the orientation of polarization of green light 90 degrees, the orientation of polarization of green light becomes again perpendicular to the plane of the paper. Accordingly, the green light enters as s-polarized light into the polarization beam splitter 14R. Therefore, the green light is again discarded off the optical path by reflection. Noise light is prevented from reentering the reflective liquid crystal display element 15R.

Noise light exiting from the crossed dichroic prism assembly 19 toward the reflective liquid crystal display element 15B for blue light contains a part of green light and blue light because of the spectral reflective characteristics of the dichroic film 18B. Of these components of light, the orientation of polarization of the blue light which is parallel to the plane of the paper is converted into a orientation of polarization perpendicular to the plane of the paper by the $\lambda/2$ wave plate 17B. Then, the blue light passes through the wavelength selective wave plate 16B without change. Accordingly, the blue light enters as s-polarized light into the polarization beam splitter 14B. Therefore, the blue light is discarded off the optical path by reflection. With respect to the green light, the orientation of polarization perpendicular to the plane of the paper is converted into a orientation of polarization parallel to the plane of the paper when the light passes through the $\lambda/2$ wave plate 17B. Then, the orientation of polarization is again rotated 90 degrees by the wavelength selective wave plate 16B. The orientation of polarization becomes perpendicular to the plane of the paper. Therefore, the green light also enters as s-polarized light into the polarization beam splitter 14B. The green light is discarded off the optical path by reflection. Noise light is prevented from reentering the reflective liquid crystal display element 15B for blue light.

Figure 3:
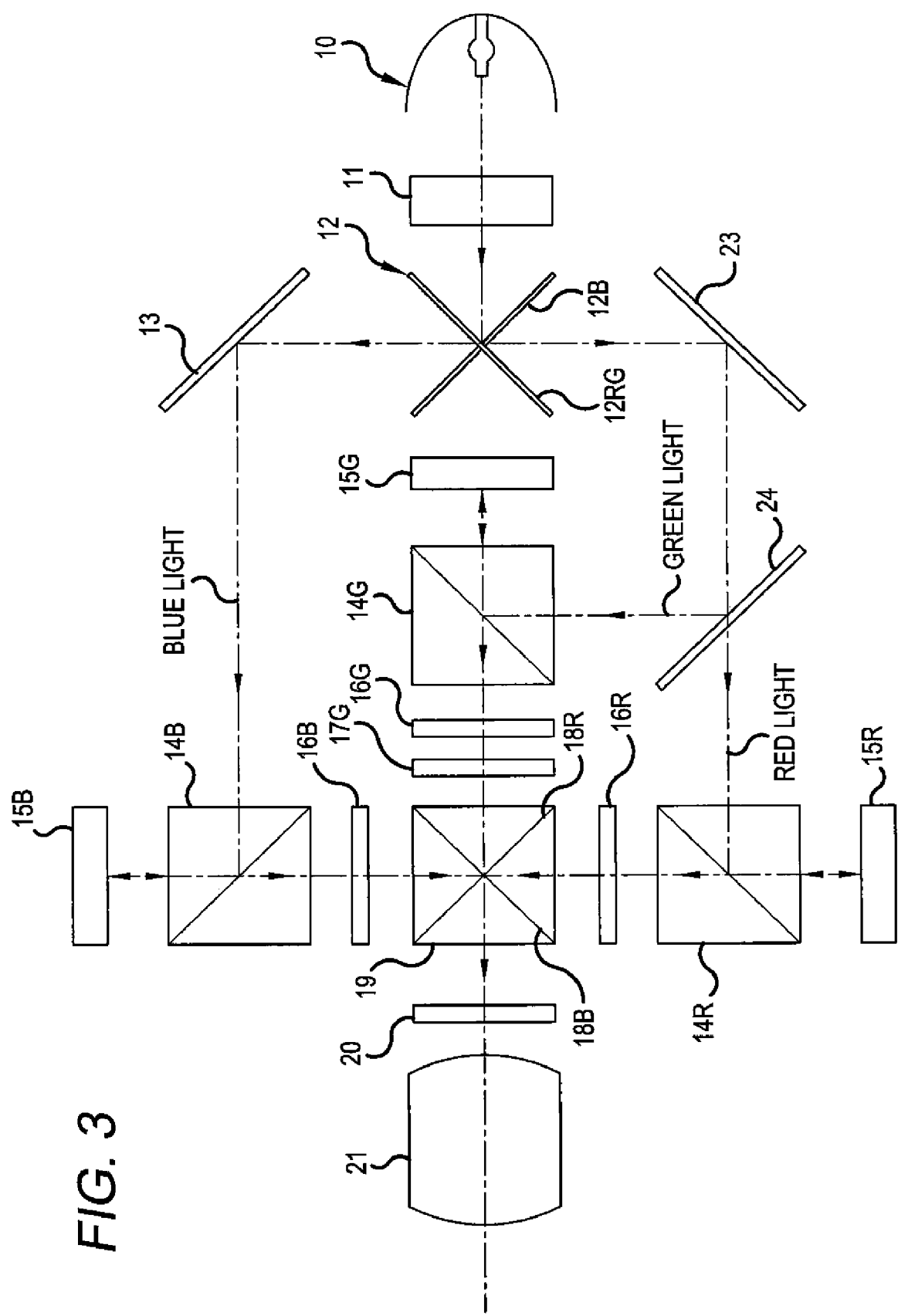
FIG. 3 is a diagram illustrating a modification to the exemplary embodiment of the present invention.

According to a projection display of an exemplary embodiment of the present invention constructed as described above, noise light reflected from the projection optical system 21 is prevented from returning to the reflective liquid crystal display elements. Consequently, generation of ghost image can be suppressed. Furthermore, in the illustrated embodiment, $\lambda/2$ wave plates 17B and 17R are disposed in the optical paths of blue light and red light, respectively. Depending on the characteristics of the crossed dichroic prism assembly 19, however, a $\lambda/2$ wave plate for green light 17G may be disposed between the wavelength selective wave plate 16G for green light and the crossed dichroic prism assembly 19, and the $\lambda/2$ wave plates 17B and 17R for blue and red lights may be omitted as illustrated in FIG. 3. In addition, in the above embodiment, the wavelength selective wave plates 16B, 16G, and 16R are disposed in the optical paths of blue, green, and red lights, respectively. Depending on the degree of produced ghost image, some of the wave plates may be omitted. For example, where the human visual sensitivity is taken into consideration, the noise light component due to green light is most conspicuous. Noise light component due to blue or red light is less conspicuous. Therefore, one or both of the wavelength selective wave plates 16B and 16R can be omitted. Furthermore, where a wavelength selective wave plate having polarization-converting characteristics which rotate the orientation of polarization of blue light 90 degrees but do not vary the directions of polarization of green and red lights is used as the wavelength selective wave plate 16B for blue light, for example, the $\lambda/2$ wave plate 17B for blue light can be omitted. Similarly, polarization-converting characteristics which rotate the orientation of polarization of only red light 90 degrees are imparted to the wavelength selective wave plate 16R for red light, the $\lambda/2$ wave plate 17R can be omitted.

As described thus far, in the present invention, a polarization converter device for converting the state of polarization of a passing light beam between linear polarization and circular polarization is disposed between a color combining prism and projection optical system. A wavelength selective wave plate acting as a $\lambda/2$ wave plate according to the wavelength of color light passing therethrough is disposed in the optical path of each color light. Noise light reflected from the projection optical system is prevented from going back to reflective liquid crystal display elements, depending on difference in orientation of polarization, as well as on the kind of color light. Consequently, it is assured that noise light is prevented from returning to the reflective liquid crystal display elements, unlike the prior art in which noise light is cut off only relying on the spectral reflective characteristics of a dichroic film or dichroic mirror having dependence on the angle of incidence. Generation of ghost image can be suppressed. Furthermore, it is not necessary to dispose a tilted dichroic mirror in the projection optical path of each color light. This eliminates the danger that color nonuniformity or astigmatism is produced.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-128208, filed Apr. 26, 2005, the contents of which is incorporated herein by reference.

What is claimed is:

1. A projection display comprising:
a light source;
a color separation optical system that decomposes white light from the light source into three color lights including red light, green light and blue light;
three polarization beam splitters including a polarization beam splitter for the red light, a polarization beam splitter for the green light and a polarization beam splitter for the blue light;
three reflective liquid crystal display elements corresponding to the three polarization beam splitters, wherein each of the three reflective liquid crystal display elements modulates polarization of incident light from one of the three polarization beam splitters and reflects modulated light to the one of the three polarization beam splitters;
a color combining prism including a dichroic film, wherein the color combining prism combines lights modulated by the three reflective liquid crystal display elements, the lights entering the color combining prism in different directions from one another, so as to output combined light;
a projection optical system that projects the combined light from the color combining prism;
a polarization converter device disposed between an exit face of the color combining prism and an entrance face of the projection optical system, the polarization converter converting state of polarization of light, which passes through the polarization converter, mutually between linear polarization and circular polarization; and
at least one wavelength selective wave plate disposed between an exit face of one of the three polarization beam splitters and an entrance face of the color combining prism, the wavelength selective wave plate showing a characteristic of a $\lambda/2$ wave plate to rotate polarization of transmitted light according to only two wavelengths corresponding to wavelengths of red light, green light and blue light passing through the wavelength selective wave plate by 90 degrees without rotating the polarization of another one of the wavelengths corresponding to transmitted red light, green light and blue light.

2. The projection display according to claim 1, which includes three wavelength selective wave plates corresponding to the three polarization beam splitters, wherein each of the three wavelength selective wave plates is disposed between corresponding one of the three polarization beam splitters and the color combining prism, and each of the three wavelength selective wave plates does not rotate the wavelengths of color light corresponding to the one of the color lights of that corresponding polarization beam splitter and rotates the wavelengths of color light corresponding to the color lights of the other two polarization beam splitters.

3. The projection display according to claim 1, which further comprises two $\lambda/2$ wave plates, wherein one of the two $\lambda/2$ wave plates is disposed between the polarization beam splitter for the red light and the color combining prism, the other of the two $\lambda/2$ wave plates is disposed between the polarization beam splitter for the blue light and the color combining prism, wherein each of the two $\lambda/2$ wave plates rotates polarization orientation of light, which passes through the each of the two $\lambda/2$ wave plates, 90 degrees such that polarization orientation of each of the blue and red lights exiting from the color combining prism is perpendicular to polarization orientation of the green light exiting from the color combining prism.

4. The projection display according to claim 1, which further comprises a $\lambda/2$ wave plate positioned between the polarization beam splitter for the green light and the color combining prism, wherein the $\lambda/2$ wave plate rotates polarization orientation of green light passing through the $\lambda/2$ wave plate by 90 degrees such that polarization orientation of each of the blue and red light exiting from the color combining prism is perpendicular to polarization orientation of the green light exiting from the color combining prism.

* * * * *